United States Patent
Clarke et al.

(10) Patent No.: US 8,154,485 B2
(45) Date of Patent: Apr. 10, 2012

(54) DISPLAY ELEMENT

(75) Inventors: Andrew Clarke, Hardwick (GB); Eloise H. Welfare, St Albans (GB)

(73) Assignee: Eastman Kodak Company, Rochester, NY (US)

( * ) Notice: Subject to any disclaimer, the term of this patent is extended or adjusted under 35 U.S.C. 154(b) by 1359 days.

(21) Appl. No.: 10/589,547

(22) PCT Filed: Mar. 22, 2005

(86) PCT No.: PCT/GB2005/001054
§ 371 (c)(1),
(2), (4) Date: Aug. 16, 2006

(87) PCT Pub. No.: WO2005/096065
PCT Pub. Date: Oct. 13, 2005

(65) Prior Publication Data
US 2007/0144888 A1    Jun. 28, 2007

(30) Foreign Application Priority Data
Apr. 2, 2004   (GB) .................................. 0407642.8

(51) Int. Cl.
*G09G 3/34*  (2006.01)
(52) U.S. Cl. .......................................... 345/84; 359/253
(58) Field of Classification Search ............... 345/84, 345/107; 359/245–246, 252–253
See application file for complete search history.

(56) References Cited

U.S. PATENT DOCUMENTS

| | | | |
|---|---|---|---|
| 4,488,785 A * | 12/1984 | Kohashi | 359/295 |
| 6,449,081 B1 | 9/2002 | Onuki et al. | |
| 6,473,492 B2 | 10/2002 | Prins et al. | |
| 6,525,866 B1 * | 2/2003 | Lin et al. | 359/296 |
| 7,119,161 B2 * | 10/2006 | Lawandy | 528/190 |
| 7,123,796 B2 * | 10/2006 | Steckl et al. | 385/40 |
| 2002/0080920 A1 | 6/2002 | Prins et al. | |
| 2003/0085850 A1 | 5/2003 | Feenstra et al. | |

FOREIGN PATENT DOCUMENTS

WO   02/099527   12/2002

OTHER PUBLICATIONS

"Seed-mediated Growth Techniques for the Preparation of a Silver Nanoshell on a Silica Sphere" by Zhong-jie Jiang and Chun-yan Liu, Phys. Chem B 2003, 107, 12411-12415.
"An investigation of electrostatic assist in dynamic wetting" by T. D. Blake et al., Langmuir 2000, 16, 2928-2935.
"Electrocapillarity modulators and large screen projection displays" by Michael Lea, Institute of Optics, University of Rochester, SPIE vol. 684 Liquid Crystals and Spatial Light Modulator Materials (1986).

* cited by examiner

*Primary Examiner* — Seokyun Moon
(74) *Attorney, Agent, or Firm* — Raymond L. Owens

(57) ABSTRACT

A display element comprising a single layer of porous material and a discrete drop of liquid. Application of a voltage between the liquid and the layer causes movement of the liquid and consequential optical changes to the element.

10 Claims, 3 Drawing Sheets

DISPLAY ELEMENT

FIELD OF THE INVENTION

This invention relates to the field of display elements, in particular to the field of passive display elements.

BACKGROUND OF THE INVENTION

Many companies are actively seeking to create a display element that is easily manufacturable These display elements can be either active, i.e. emit light such as LED, OLED, PLED, EL, or passive, i.e. affect the passage, reflection or refraction of light such as LCD, CLC, e-ink etc.. Some passive systems are bistable such they can be switched and remain switched after the power has been removed. Most configurations previously disclosed can be readily adapted to colour functionality.

Various electrowetting display elements are known in the prior art.

U.S. Pat. No. 6,473,492 discloses a fluid element device that rearranges fluid within a capillary tube. A voltage is used to move the fluid within the capillary to a desired level. U.S. 2002/0080920 discloses a filter device using an array of elements based upon U.S. Pat. No. 6,473,492 for use with X-ray imaging equipment. U.S. 2003/0085850 discloses an electrostatic device that changes a meniscus shape such that the focal length of the device changes.

U.S. Pat. No. 6,449,081 describes a focusing element based on the electrowetting phenomenon. WO2/002099527 describes a display element with a defined prismatic structure that contains two immiscible fluids together with electrodes such that the fluid can be rearranged with the cell.

Problem to be Solved by the Invention

In display elements based on the rearrangement of liquid it is of benefit to ensure the liquid is captured by capillary forces. This is achieved by making the elements small. Thus the existing art does not easily address the requirement for large pixel areas. Furthermore, the existing art describes structures that necessarily require micro-fabrication and thus relatively complex construction methods.

It is the purpose of the current invention to provide a new device based on a combination of mechanisms that has previously not been contemplated. This class of device will be adaptable to colour though the description below is for a single colour element. The display element is capacitative in nature and thus has low power consumption and is switched by low voltages. The element modifies the reflectivity of the surface thereof.

SUMMARY OF THE INVENTION

According to the present invention there is provided a display element comprising a single layer of porous material, a discrete drop of liquid and means for connecting a voltage supply to the layer, the layer comprising a plurality of conductive particles covered with a lyophobic and electrically insulating covering, whereby on application of a voltage between the liquid and the porous layer the drop of liquid moves into the layer, the drop moving back out of the layer upon removal of the voltage, the movement of the liquid effecting an optical change when viewed from above the porous layer.

The invention further provides a device comprising at least one element as described above including means for connection of each element to a circuit to create a matrix display.

Advantageous Effect of the Invention

The present invention is simple to manufacture over large areas because of the stochastic structure of the elements and may be manufactured in part via roll-to-roll techniques. It fulfils the requirement of capturing small liquid elements by capillarity. However the switching time of the element is not limited by its area. It is also simple to address and drive, via suitably patterned passive or active matrix type backplanes.

BRIEF DESCRIPTION OF THE DRAWINGS

The invention will now be described with reference to the accompanying drawings in which.

DETAILED DESCRIPTION OF THE INVENTION

Figure 1:
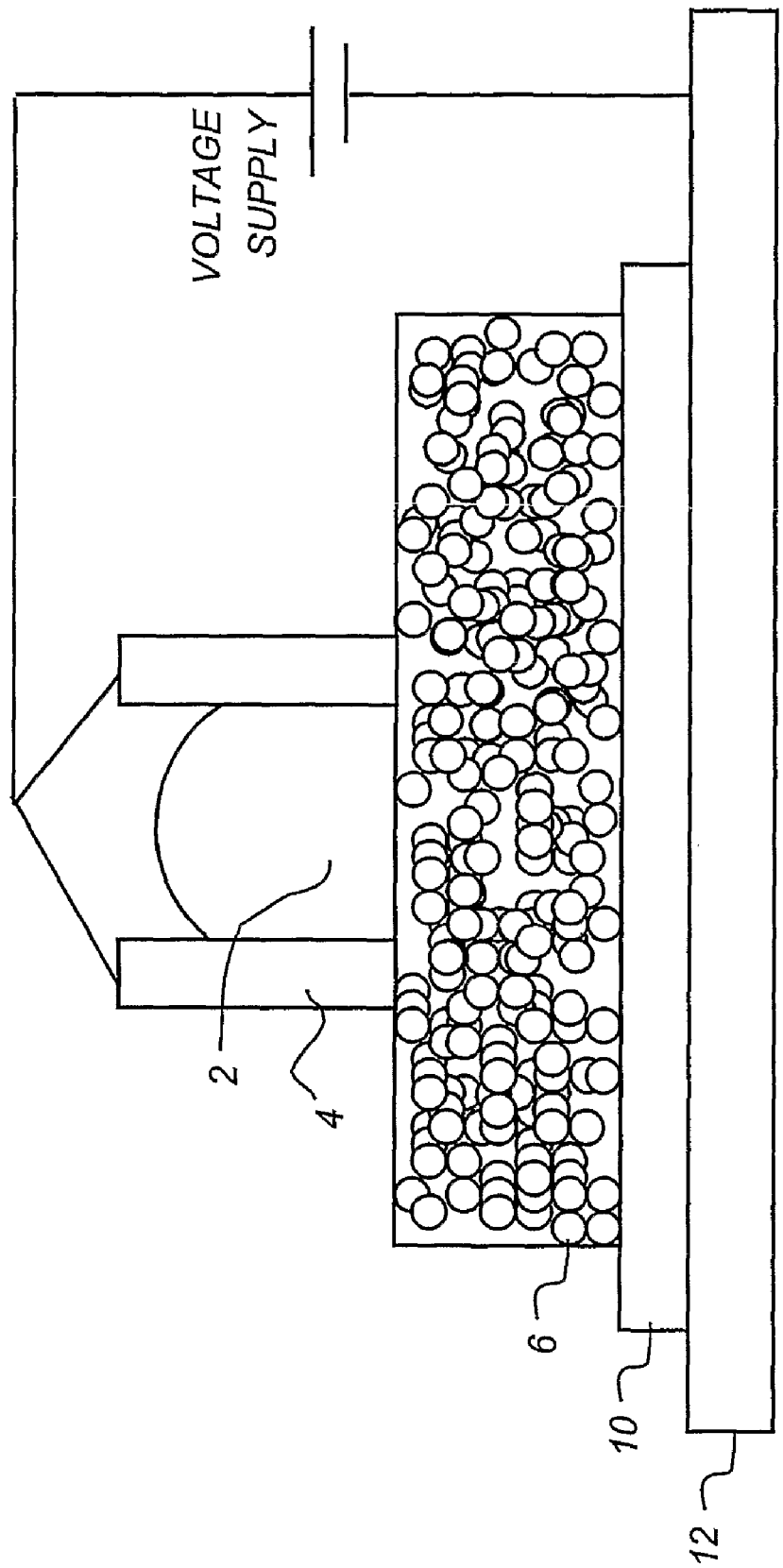
FIG. 1 is a schematic view of a single layered display element according to the invention.

FIG. 1 is a schematic view of a single layered display element 1 according to the invention. The invention relates to a passive display element.

Throughout the description and claims the term "upper" defines the side from which an element would be viewed. Use of the term "upper" is not to be taken as limiting the orientation of the element according to the invention.

The element is based on a single layer porous system. The element 1 comprises a lyophobic porous layer 8 on which is placed a drop of conductive liquid 2. Preferably the liquid is coloured. This includes the liquid being white. The liquid may be coloured by the addition of a dye or pigment. The conductive liquid may be created by adding ions to a solvent. Alternatively the conductive liquid may be an ionic liquid.

Figure 2:
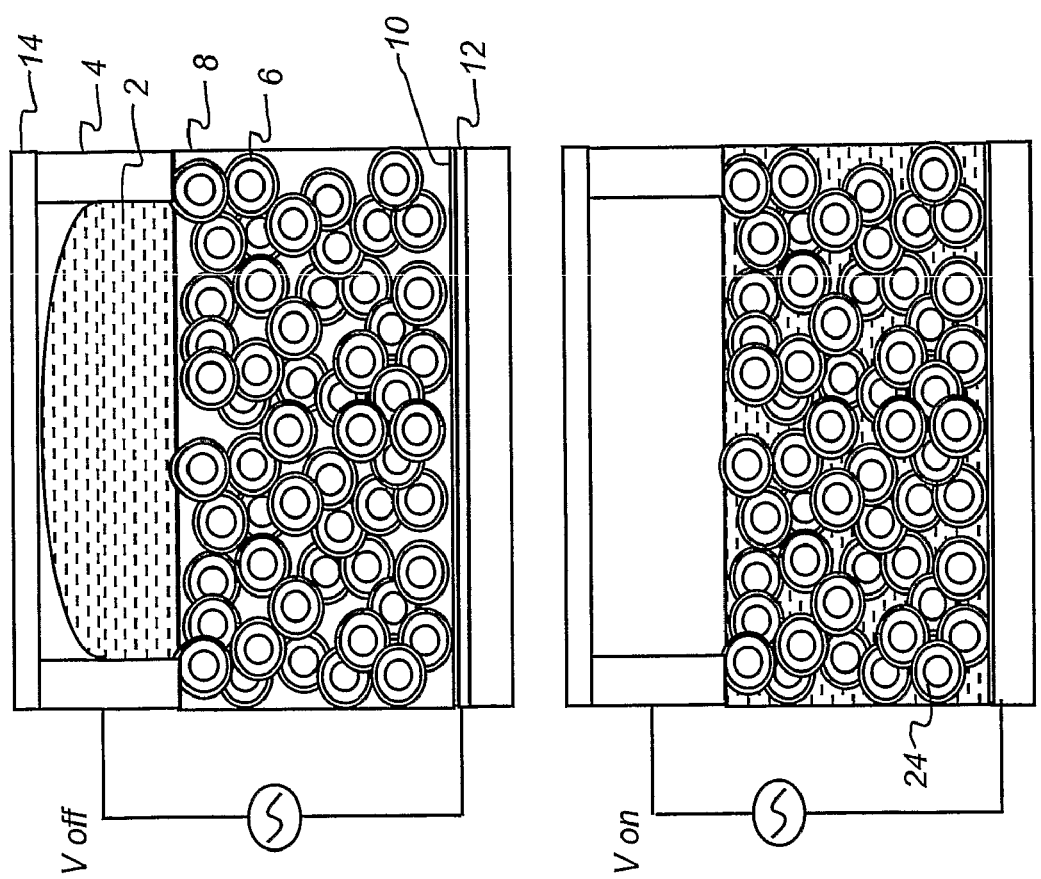
FIG. 2 shows the element both with and without voltage applied.

An electrode 4 pins the drop of liquid in position on top of the lyophobic layer 8. Advantageously the liquid would have a contact angle with the electrode of less than 90°. A dielectric layer 10 is provided below the porous layer 8. A conductive layer 12 is provided below the dielectric layer 10. The electrode 4 and the conductive layer 12 have means for connection with a voltage supply. The conductive layer 12 may comprise a wire grid. A transparent substrate 14 is located above the electrode 4 to encapsulate the drop of liquid. This is shown in FIG. 2.

The porous layer 8 comprises particles 6 which have been deposited to form a porous network. The liquid has a contact angle greater than 90° with the particles 6. The particle sizes would be in the order of 30 nm to 2 microns. The particles may be coloured or may be black. The particles 6 are conductive. The particles may be solid metal particles or only the shell thereof may be conductive. If the particles have a shell the thickness of the shell can be chosen to create a particular coloured particle. An explanation of this can be found in Seed-mediated Growth Techniques for the Preparation of a Silver Nanoshell on a Silica Sphere, Zhong-jie Jiang and Chun-yan Liu, J. Phys. Chem B 2003, 107, 12411-12415.

Whichever type of particle is used they should be covered with a thin layer or covering 24 of a lyophobic material with low contact angle hysteresis and which is also electrically insulating. Suitable particles would be conductive silver particles encased with lyophobic and dielectric mercaptan. It will be understood by those skilled in the art that this is an example only and any conductive material and lyophobic, electrically insulating covering could be used within the terms of the invention. The layer of lyophobic material may be made of, for example, a polymer, a polyelectrolyte, a self assembled monolayer (SAM) or an inorganic shell.

The display element 1 uses electrostatics to drive the drop of liquid 2 into and out of the porous layer. With no voltage applied the drop of liquid 2 sits on top of the porous layer 8. The colour of the element then appears as the colour of the liquid.

When a voltage is applied between the liquid and the conductive layer 12 an effect called "electrowetting" takes effect. Electrowetting is explained in Blake et al, Langmuir 2000, 16,2928-2935. The voltage applied is in the order of 1 volt, a maximum of 20V being envisaged.

The electrowetting effect reduces the contact angle of the liquid 2 with the porous layer 8. The usual electrowetting equation may be used $$\cos(\theta) = \cos(\theta_0) + \frac{\varepsilon \varepsilon_0 V^2}{2d\gamma}$$

Where $\theta$ is the contact angle in the presence of a voltage, $\theta_0$ is the contact angle with no voltage, V is the voltage, $\varepsilon$ is the dielectric constant of the lyophobic layer, $\varepsilon_0$ is the permittivity of free space, $\gamma$ is the liquid surface tension and d is the thickness of the lyophobic layer. The capillary pressure, $\Delta P$, within the pore system can be defined as $$\Delta P = \frac{\gamma \cos(\theta)}{a}$$

where a is the average pore radius within the porousstrilrture.

With voltage applied the capillary pressure in the porous layer 8 is such that the drop of liquid 2 will be pulled into the layer 8. This can be seen in FIG. 2. The colour of the element then appears as a mixture of the colour of the liquid 2 and the colour of the particles 6, the mixture depending on the porosity of the layer 8.

On removal of the voltage the contact angle of the liquid 2 with the porous layer increases again. The capillary pressure in the porous layer is then such that the liquid withdraws back out of the porous layer. The colour of the element then again appears as the colour of the liquid.

Figure 3:
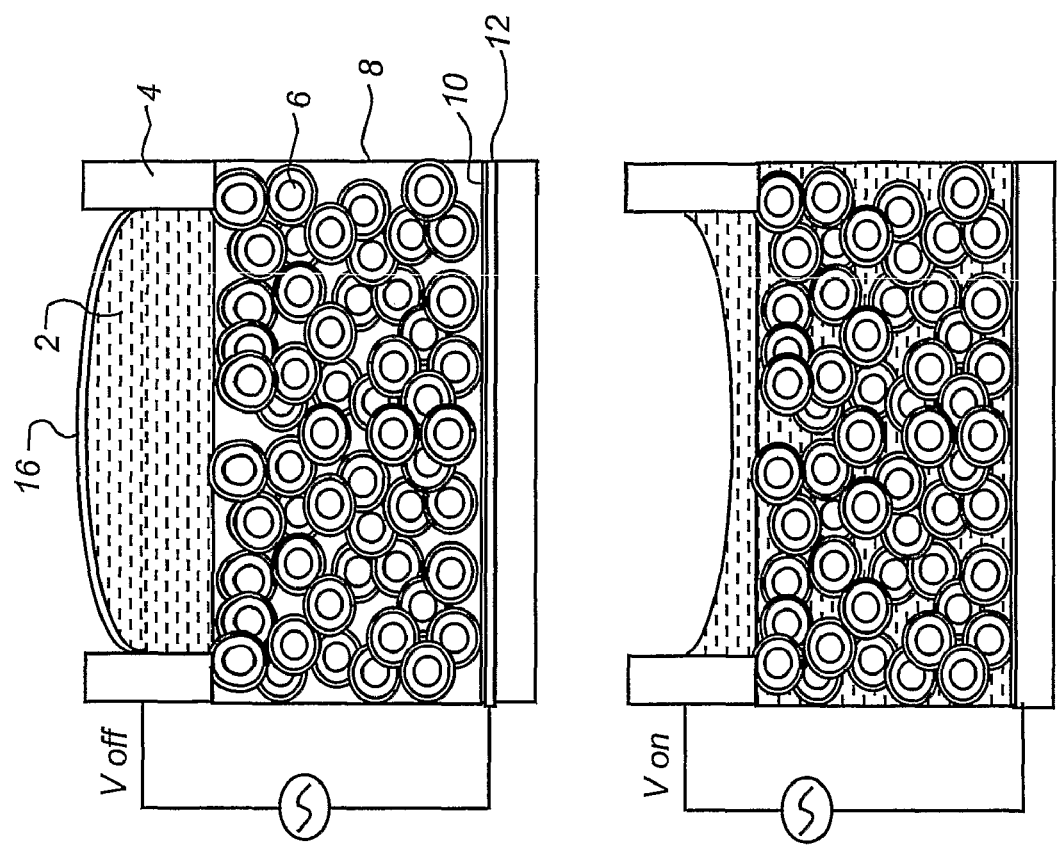
FIG. 3 is a schematic view of a further display element in accordance with the invention.

A further embodiment of the invention is shown in FIG. 3. This embodiment provides a reflective or transparent membrane encapsulating the liquid. In all other respects it is similar to the embodiment shown in FIG. 1.

The membrane 16 is formed of a flexible material. Possible materials include a very thin polymer or a very thin metal. However the invention is not to be taken as limited to these materials. The membrane could double as the electrode.

With no voltage applied to the electrode 4 the membrane, viewed from above, has a convex shape. Therefore what will be seen is a diffuse scattering of reflected or refracted light. When a voltage is applied the liquid 2 is pulled into porous layer 8 as described above. The membrane flexes and becomes concave when viewed from above. The light is more concentrated when reflected or refracted back from the concave surface of the membrane. Thus an optical change is seen when voltage is applied to the element 1.

On removal of the voltage the liquid 2 exits the porous layer 8 and the membrane 16 returns to its original convex shape.

The following working example demonstrates the principle of the invention.

A base electrode, lower conductor, was formed by an indium tin oxide (ITO) coating on a poly-ethylene-teraphthalate (PET) base. This was used as supplied and cut into appropriately sized pieces. The ITO layer faced upwards and provided a conductive surface onto which the porous display device could be built.

The ITO base was dip coated (3-4 layers) with a fluoropolymer (Fluoropel 804A, sourced form Cytonix Corporation), which behaved as a hydrophobic dielectric layer. The thickness of the layer was approximately 3 µm.

The porous layer contained 200 nm diameter silver particles which were coated in a layer of octadecyl mercaptan. The silver particles were precipitated on the reduction of silver nitrate with sodium borohydride. The octadecyl mercaptan was added immediately after precipitation. The octadecyl mercaptan gave a hydrophobic and electrically insulating coating to the silver particles. The resulting coating, showed a step change in capacitance with voltage (at 2V AC peak-peak, 1 kHz) when the capacitance was measured with a droplet of 20 g/l NaCl solution placed on the surface. This indicated that the drop was being pulled reversibly in and out of the porous network. The drop of liquid switched into and out of the device at 2V peak to peak. The switch was reproducible and the same switch could made several times with a single droplet.

A matrix or plurality of elements can be assembled to form a display device. In this respect a grid of electrodes could be provided onto which a plurality of individual drops of liquid could be placed. The individual electrodes can thus be addressed individually to switch individual display elements as pixels.

The invention has been described in detail with reference to preferred embodiments thereof. It will be understood by those skilled in the art that variations and modifications can be effected within the scope of the invention.

The invention claimed is:

1. A display element comprising:
    a) a conductive layer;
    b) a dielectric layer provided over the conductive layer;
    c) a porous material layer provided over the dielectric layer and spaced from the conductive layer, the porous material layer including a plurality of conductive particles covered with a lyophobic and electrically insulating covering;
    d) a discrete drop of a conductive liquid provided over the porous material layer, but substantially not in the porous layer;
    e) an electrode provided over the porous material layer such that the electrode is in contact with and contains the drop of conductive liquid; and
    f) wherein the conductive liquid reversibly moves into the porous material layer upon application of a voltage between the conductive layer and the electrode, and wherein the conductive liquid moves back out of the porous material layer upon removal of the voltage, the movement of the liquid effecting an optical change when viewed from above the porous material layer.

2. The display element as claimed in claim 1 wherein the conductive particles are metallic.

3. The display element as claimed in claim 1 wherein the drop of liquid is encapsulated by a flexible membrane.

4. The display element as claimed in claim 3 wherein the membrane is transparent.

5. The display element as claimed in claim 1 wherein the porous layer has a pore size greater than 30 nm and less than 2 μm.

6. The display element as claimed in claim 1 including means for connecting each element to a circuit to create a matrix display.

7. The display element of claim 3 wherein the membrane takes a convex shape when no voltage is applied and a concave shape when a voltage is applied.

8. The display element of claim 1 wherein the conductive liquid contains a dye or a pigment to provide a colored liquid.

9. The display element of claim 1 wherein the conductive liquid is an ionic liquid.

10. A display device comprising a matrix array of the display elements of claim 1.

* * * * *